United States Patent Office 3,526,448
Patented Sept. 1, 1970

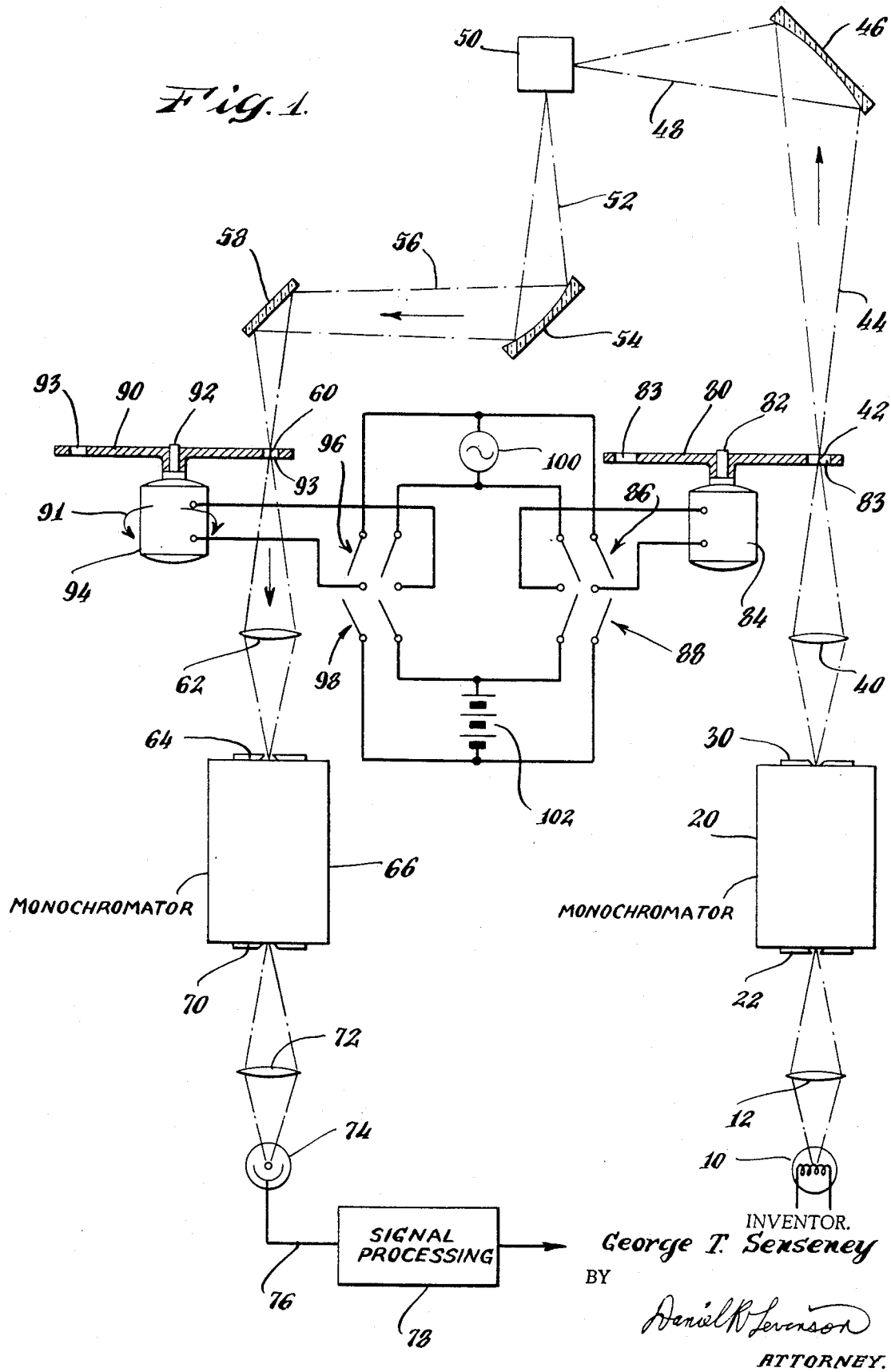

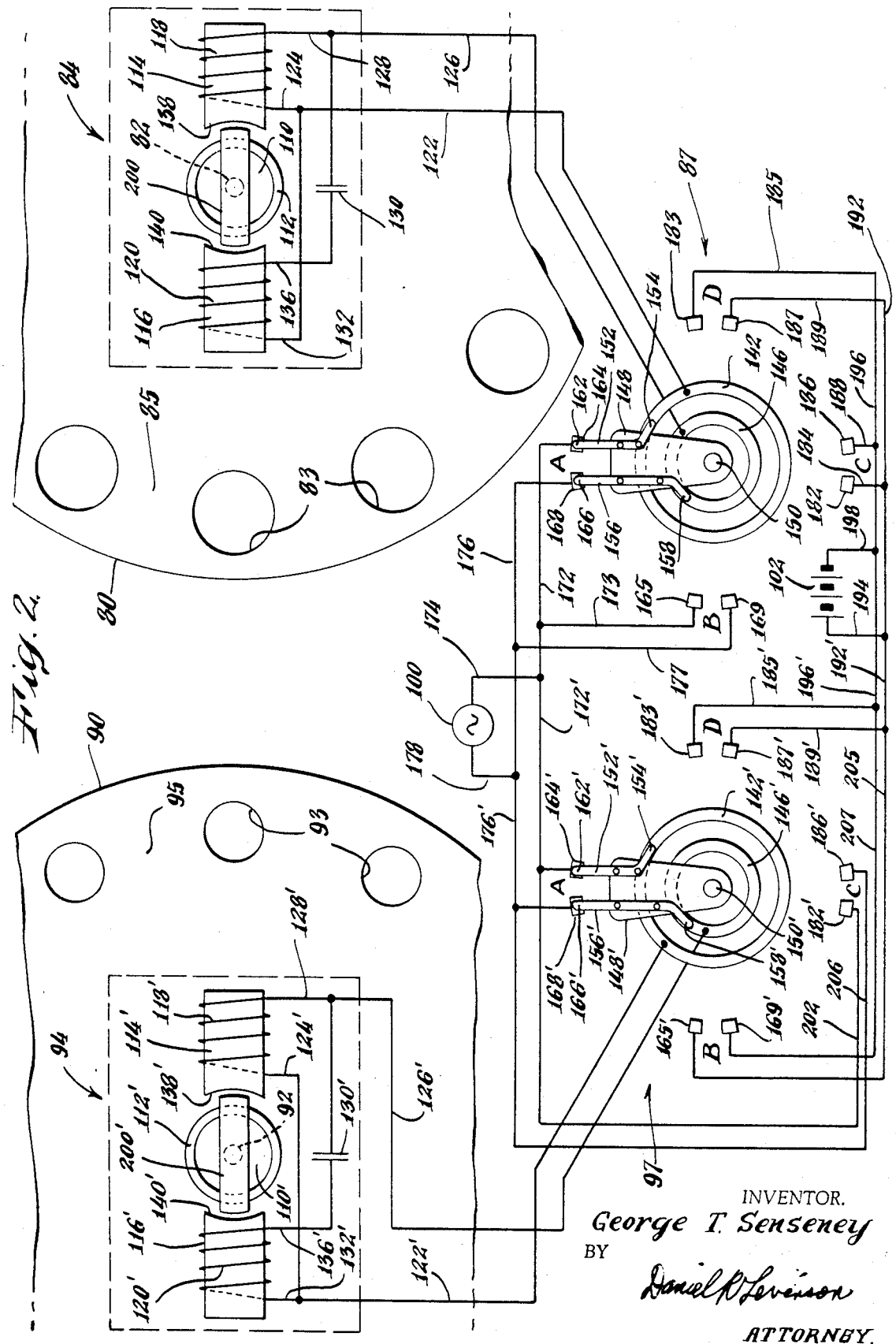

3,526,448
SYNCHRONOUS OPTICAL CHOPPING SYSTEM
George T. Senseney, New York, N.Y., assignor to The Perkin-Elmer Corporation, Norwalk, Conn., a corporation of New York
Filed Feb. 14, 1967, Ser. No. 616,085
Int. Cl. G01d 5/36; G02f 1/30
U.S. Cl. 350—272                                    10 Claims

ABSTRACT OF THE DISCLOSURE

A pair of rotating optical choppers may be operated synchronously (with any desired phase relationship therebetween or separately with the stopped chopper in a known predetermined position. Each of the choppers is rotated by its own individual two-pole polarized hysteresis synchronous motor, one of which may be rotatively adjusted to obtain any desired phase relationship between the choppers. Each motor is energized by the same A.C. line voltage for synchronous operation; one pole winding of either of the polarized synchronous motors is supplied with a D.C. voltage to stop the chopper in a desired known position.

---

This invention relates to a device for controlling the operation of two rotary elements. More specifically the invention concerns the controlling of two optical choppers so that they may be run synchronously (with any desired phase relationship), individually with the stopped chopper in a known predetermined position, or with both choppers stopped in such known positions.

In optical instruments it is sometimes desirable to rotate a pair of elements (for example, choppers) in known but adjustable phase relationships. Under certain conditions it may be desirable to stop either one of the choppers (while allowing the other to rotate), usually with the stopped chopper in a particular desired relationship (for example, with an open sector or aperture in the beam).

In certain types of optical instruments, the desirable versatility of the chopper control may become relatively complex. For example in instruments designed to measure either the fluorescence or phosphorescence of a sample material, an optical chopper is preferably positioned on each side of the sample (the first between the illuminating or excitation source and the sample, and the second between the sample and the detector measuring the luminescence of the sample). When both choppers are rotating and in phase, the instrument will measure fluorescence since the measurement is being made synchronously with the excitation. To measure conventional or short decay-time phosphorescence, the choppers are run 180° out of phase, so that the sample is irradiated during one half of the cycle and the sample-emitted radiation is collected and measured during the other half cycle. For long decay-time phosphorescent measurements, the operator may desire to stop both choppers in their open position (using an auxiliary shutter to cut off the excitation radiation in a controlled manner). Finally, when the instrument is utilized to make both fluorescence and phosphorescence tests successively (for example, with the same sample material), the invention allows simple and rapid switching of the instrument from one such mode to the other. In particular, if the two choppers are first adjusted so that they are 180° out of phase and both rotating, conventional phosphorescent measurements may be made; by merely stopping, say, the first excitation chopper in its open position, the instrument may then be used for fluorescence measurements (the radiation reaching the detector actually consisting of both fluorescence and some phosphorescence since the sample is continuously excited). Fluorescence measurements may be made with either chopper stopped and the other one rotating, with both rotating (in phase), or even with both stopped (although the D.C. signal so generated would require special signal handling if precise results are to be obtained). Although it will be hereinafter assumed that the optical instrument in which the invention is utilized is for testing the fluorescence and phosphorescence of sample materials, the invention may obviously be utilized in different types of optical instruments.

An object of the invention is the provision of a system comprising two rotary optical elements, in which both optical elements may be synchronously rotated in a desired phase relation, in which each (or at least one) of the rotary elements may be readily stopped in a predetermined position, and in which restarting of the stopped chopper inherently resumes the synchronous operation of both elements in the same desired phase relationship.

A further object of the invention is the provision of a system as just described, in which the phase relationship between the elements is adjustable, and automatically reproducible after stopping either or both of the rotary elements.

Other objects, advantages and features of the invention will be obvious to one skilled in the art upon reading the following specification in conjunction with the accompanying drawings, in which:

FIG. 1 is a schematic side view of an analytical instrument for testing both the fluorescence and phosphorescence of a sample material, incorporating a pair of choppers according to the invention; and FIG. 2 is a somewhat more detailed diagrammatic illustration of the chopper motors and their control circuit.

For exemplary purposes only, the inventive chopper arrangement is shown in FIG. 1 in an instrument for testing the luminescence (i.e., the fluorescence and phosphorescence) of a sample at variable wavelengths of both excitation and measured energy.

Various conventional parts of this instrument are schematically illustrated and others shown in simplified form. Radiation from a source 10 is gathered and focused by an optical system, schematically illustrated as a simple lens 12, to form a source image at 16. This image is formed at the entrance slit 22 of a diagrammatically indicated first or excitation monochromator 20. In a typical actual instrument, one or more concave mirrors would normally be utilized to form the source image, which may be re-imaged into the monochromator entrance slit 22. Monochromator 20 causes substantially monochromatic radiation (of a wavelength which may be varied in well-known ways by adjustment of the dispersion element of the monochromator) to leave exit slit 30. A further optical system schematically illustrated as a simple lens 40, may reconverge the diverging light from exit slit 30 to an image point 42. The once again diverging beam 44 may be again converged by, for example, a concave sample illuminating mirror 46 so as to provide an illuminating or excitation beam 48 onto sample 50.

The resulting luminescent radiation from the sample at 52 is converged by concave mirror 54 into beam 56, which after folding by plane mirror 58 will come to a focus at point 60. The again diverging beam from point 60 may be refocused by an optical system, schematically illustrated as a simple lens 62, to a small image in the entrance slit 64 of a second monochromator 66. Preferably the first monochromator 20 is of a high efficiency (i.e., is relatively optically "fast"), while the second monochromator 66 has relatively high resolution. Therefore the sample-emitted radiation leaving exit slit 70 of monochromator 66 will be highly monochromatic. This radiation is then refocused by a final optical system, diagrammatically illustrated as a simple lens 72, onto a radiation detector 74. An electrical signal, proportional to the intensity of the luminescence from the sample, will therefore appear at the output 76 of the radiation detector. This output signal may then be electronically processed in well-known ways, by circuits schematically represented by block 78.

Preferably some technique for effectively eliminating the effects of source (10) intensity fluctuations is incorporated in the instrument. One such technique is to monitor the radiation intensity, say, from the first monochromator (e.g., somewhere between elements 30 and 46), and to maintain this intensity constant. For example, a second radiation detector (not shown) may monitor the radiation between elements 40 and 46 (by means, for example, of a partially silvered mirror). The output of this second detector may drive a conventional servo system for adjusting, say, the width of the entrance and exit slits (22, 30) of the first monochromator. Alternatively, rather than actually adjusting the effective source intensity, source intensity fluctuations may be instead electrically compensated by well-known "double-beam" techniques.

In order to provide an A.C. modulation of the radiation (so that background radiation may be discriminated, and the signal processing done with A.C. amplifiers and other circuits, which are drift-free compared to D.C. circuits), at least one chopper would normally be present in such an instrument. Such chopping is commonly accomplished by a rotating optical chopper which periodically interrupts the optical beam. In the illustrated instrument a plurality of choppers are used so as to obtain certain specific relationships of the chopped beams and to provide more than one mode of operation of the instrument. In particular in the luminescence measuring system of FIG. 1, a pair of choppers 80, 90 are positioned in the optical beams on each side of the sample. If both choppers are synchronously driven in phase with each other, the detector 74 will "see" primarily fluorescent radiation from the sample; if both choppers are driven completely out of phase (i.e., a transparent part of one chopper and an opaque part of the other chopper are always in their respective beams), the detector 74 will receive only phosphorescent radiation from the sample. As previously noted, there are additionally certain types of measurements that are preferably made with one or the other chopper stopped. The present arrangement of these choppers and their control circuit allows all of these types of operations, and, in particular, ease in changing from one to another.

The first or excitation chopper 80 may consist of a relatively large disc having an equal number of transparent and opaque portions which will alternately intersect the beam at point 42. Although such a chopper may be made in many forms (e.g., a series of opaque and transparent sectors), the illustrated exemplary chopper comprises merely a circularly arranged series of evenly spaced apertures 83 in an opaque disc (which may for example be blackened metal). Chopper 80 may be rigidly attached to motor shaft 82, which in turn is rigidly attached to the rotor of motor 84. A similar chopper disc 90, rigidly attached motor shaft 92 and motor 94 may be positioned as indicated in FIG. 1 so that the chopper alternately blocks and passes the beam between elements 58 and 62, as at point 60. Both chopper motors 84 and 94 may be supplied from the same A.C. source, as by a pair of double pole switches 86, 96. An exemplary embodiment of a convenient switch arrangement will be described relative to FIG. 2. Since motors 84 and 94 are of the polarized, synchronous type, choppers 80 and 90 will be synchronously driven in a known phase relationship whenever switches 86 and 96 are closed.

Assuming the choppers 80 and 90 have the same number of evenly spaced transparent and opaque portions as each other, the same angular orientation (about the axis of shafts 82 and 92) of motors 84 and 94 will cause the choppers to be in phase (i.e., both open together and close together). Rotation about its shaft axis of either entire motor and chopper assembly will cause a change in this phase relationship of the chopper apertures. For example, if each chopper (80, 90) comprises twelve circularly arranged apertures, rotation of one of the chopper and motor assemblies by 15° will cause the apertures of one chopper to be completely out of phase with the apertures of the other chopper. Thus at least one of the two chopper and motor assemblies is mounted so that it may be rotatably adjusted about the shaft axis for at least, say, a 15° rotation. For exemplary purposes it will be assumed that at least chopper and motor assembly 90–94 is adjustable in this manner (as indicated at 91).

Assuming that the transparent portions in each of the choppers are circular apertures 83 and 93 respectively, the diameter of each should be at least somewhat greater than the diameter of the beam intercepted. Additionally the opaque portions 85, 95 between consecutive apertures should also be at least this size. This insures that the radiation beam will be fully passed and fully obscured, respectively, during at least part of each chopping cycle. Preferably the apertures (and the opaque portions) are considerably larger than the cross-section of the beam being chopped, so that most of the time the entire beam is wholly passed or wholly blocked. Preferably, the apertures 93 of, say, the second chopper are made slightly smaller than the apertures 83 (and the opaque areas 85) of the first chopper. This not only provides some tolerance to imperfections in shaft alignment, angular adjustment of the chopper and the like, but also precludes any substantial quantity of source radiation from passing through both choppers (due to the effects of diffraction, reflection and scattering by the edges of the blades surrounding the apertures) when the choppers are in their out-of-phase adjustment.

FIG. 1 also schematically illustrates (by means of a pair of double pole switches 88, 98) that a D.C. source 102 may be substituted for the A.C. source 100 across the input terminals of either motor (84, 94). As will be described in conjunction with FIG. 2 immediately below, switching of a source of D.C. current to either motor will cause it to stop with its rotor (and therefore the chopper) in a specific position. Assuming that only chopper and motor assembly 90–94 is rotatably adjustable, then chopper 80 will always be stopped by the application of D.C. current in its open position; while chopper 90 will be stopped in an open position if it is in phase with chopper 80, in a closed position if the entire assembly 90–94 has been rotated to out-of-phase relationship.

A preferred embodiment of the motor and switching arrangement for obtaining the various chopper modes is schematically illustrated in FIG. 2. In FIG. 2 the chopper motors (84, 94) and the A.C. and D.C. sources (100, 102) have the same general reference numeral as used in FIG. 1. However, each of the switches 86 and 88 on the one hand, and 96 and 98 on the other, is shown as a four-position rotary switch, 87 and 97, respectively. Since most of the parts of both motors 84 and 94, and switches 87 and 97 are substantially identical, only one (84, 87) of each of these will be described first.

Motor 84 (and 94) is of the two-pole polarized hysteresis synchronous type, comprising a rotatably mounted rotor 110, the circumference of which contains at least one annular ring of a material which is capable of being magnetized to a relatively great degree; one of these rings is indicated at 112. As is well understood in the synchronous motor art, the material of ring 112 exhibits an ease of "magnetizability" which is between that of soft iron and hard steel. Thus the material is reasonably easy to magnetize, but it resists to a relatively high degree any immediate attempt to demagnetize (or magnetize in the opposite sense) it. This results in a lag or "hysteresis" of the magnetic material of ring 112 in conforming to the instantaneous magnetic field caused by the poles (114, 116) and the (normally) A.C. current in their windings (118, 120). If these coils are wound in the same sense (as indicated in FIG. 2) the two ends of each coil would also be connected to the energizing leads 122 and 126 in the same manner. Thus both left-hand coil ends are connected at 124 and 132, respectively, to lead 122; and the right-hand ends are connected to lead 126 by leads 128 and 136, respectively. Capacitor 130 between lead 126 and 136 causes a moderate phase shift (e.g., 90°) in the A.C. current applied to coil 120 relative to that in coil 118, so as to cause a rotating magnetic field and insure self-starting of the motor (as is now well known in the hysteresis synchronous motor art). Thus, the magnetic field of coils 118 and 120 will be in the same direction (but with a phase lag in maxima), so that the facing curved surfaces (at 138 and 140, respectively) will be of opposite polarity (with the same lag in maximum strength) during normal A.C. operation.

Leads 122 and 126 are electrically connected respectively to an outer and inner stationary slip ring (142 and 146) of switch 87. A rotary switch arm member 148 is rigidly attached to a central shaft 150, which in turn is rotatably mounted in a bearing or bushing means (not shown) to a fixed part of the apparatus. The nonconductive switch arm 148 carries a first conductive lead or jumper 152, which makes electrical sliding contact with stationary slip ring 142 as by brush 154. A second electrically conducting jumper 156 on switch arm 148 makes sliding contact at 158 with the inner slip ring 146. The opposite ends of jumpers 152 and 156 terminate in sliding contacts or brushes 162 and 166, respectively. These spaced contacts are in substantially the same plane and the same circumferential distance from shaft 150 as are four pairs of stationary contacts. Thus in the position of the switch arm 148 shown in FIG. 2, sliding brushes 162 and 166 connect stationary contacts 164 and 168 to the outer slip ring 142 and the inner slip ring 146, respectively.

Contact 164 is connected by leads 172 and 174 to one side of the A.C. source 100; contact 168 is connected by leads 176 and 178 to the other side of the same source. Therefore in the position shown for switch arm 148, one side of the source is connected by leads 174 and 172 through contact 164 and brush 162, jumper 152, brush 154, slip ring 142, lead 122, and finally leads 124 and 132 to the left sides of coils 118 and 120, respectively. At the same time the other side of source 100 will be connected through leads 178 and 176 to stationary contact 168, through brush 166, jumper 156, brush 158, ring 146, lead 126 and finally leads 128 and (through capacitor 130) 136 to the right sides of coils 118 and 120, respectively. Thus the position of switch arm 148 shown will connect both coils of the hysteresis synchronous motor 84 to the A.C. source 100.

The left-hand pair of stationary contacts 165 and 169 of switch 87 are connected by leads 173 and 177 respectively to leads 172 and 176. For this reason stationary contacts 165 and 169 will act in a directly analogous manner to, respectively, contacts 164 and 168 when switch arm 148 is in its leftmost position. For convenience of reference the upright position will be considered the A position and the left-hand position of switch arm 148 will be hereinafter referred to as the B position of the switch, as indicated in FIG. 2. Thus switch 87 closes exactly the same circuits in either its A (uppermost) or B (leftmost) positions. Obviously no circuit is completed when switch arm 148 is between these two positions.

In the lowermost or C position of switch arm 148, brushes 162 and 166 will close upon stationary contacts 182 and 186 respectively. These lower contacts are connected by leads 184 and 188 respectively to main D.C. leads 192, 196 respectively, which in turn are connected by leads 194 and 198 to opposite sides of a D.C. source 102. When switch arm is in this lower position, one side of D.C. source 102 will be connected through leads 194, 192 and 184 to contact 182, brush 162, jumper 152, sliding contact 154 to ring 142, over lead 122, and by each of the short leads 124 and 132 to the left-hand sides of coils 118 and 120, respectively. The other side of the D.C. source will be connected through leads 198, 196 and 188 to stationary switch contact 186, through brush 166, jumper 156 and sliding contact 158 to the inner ring 146, and then through main lead 126 and branch lead 128 to the right-hand side of coil 118 of the motor.

The presence of capacitor 130 effectively decouples the D.C. circuit from lead 136, thereby isolating the left-hand coil 120 from any D.C. current. Therefore in this position of the switch only the right-hand coil 118 is energized so as to cause pole piece 114 to be a constant unidirectional magnet, coil 120 and pole piece 116 being substantially unmagnetized. A small permanent magnet indicated at 200 is rigidly attached to rotor 110, so that movement of switch arm 148 to the lowermost or C position will cause the rotor to be magnetically attracted to the position indicated, with permanent magnet 200 aligned with the magnetized pole 114 and coil 118. Although shown relatively prominently for purposes of emphasis in FIG. 2, permanent magnet 200 is in fact of such dimensions and magnetic strength that it has little effect on the magnetic properties of the rotor in normal running condition (i.e., when a A.C. current is supplied to both of the coils, 118, 120), but has sufficient strength for the appropriate pole thereof to be quite strongly attracted to pole 114 when D.C. current is flowing through coil 118.

The last pair of stationary switch contacts (183, 187) at position D of the switch are directly analogous in structure, relationship and function to contacts 182 and 186 of the C position. Therefore these contacts and their immediate leads are numbered one higher than the corresponding C position contacts. It will be obvious that movement of switch arm 148 to this right-hand or D position will cause exactly the same effect as movement of the switch arm to the lowermost or C position just described. Thus both the A and B positions and the C and D positions of switch 87 are in effect redundant in that each pair cause exactly the same operation. These two pairs of similar switch positions are shown separately in the exemplary circuit of FIG. 2 so as to illustrate more clearly that there are in fact four different switching arrangements when the other switch 97 and its motor 94 are also considered.

The left-hand motor 94 may be exactly identical to motor 84 just described, and therefore the parts thereof are not described in detail. Thus all of the elements 112′ through 140′ of motor 94 may be identical to the corresponding elements (112–140) of motor 84. Similarly motor shaft 92 may be identical to shaft 82; and chopper blade 90 would have the same number of apertures (93) evenly spaced in the same manner as apertures (83) of blade 80. Obviously the motors need not be identical, nor even the choppers necessarily similar to each other. For example, one of the motors may even run at a different synchronous rotation rate (for example, twice as fast) than the other, and its chopper have a different number of apertures to compensate this difference in speed (i.e., one half as many apertures).

The structure of switch 97 itself (i.e., exclusive of its external connections) may also be identical to that of switch 87. Specifically, outer and inner rings (142′, 146′), switch arm (148′), jumpers (152′, 156′), their inner brushes (154′, 158′) and outer sliding contacts (162′, 166′), and the four pairs of stationary contacts (164′, 168′, 165′, 169′, 182′, 186′ and 183′, 187′) of switch 97 may all be structurally identical to the corresponding (unprimed) elements of switch 87. Switch arm shaft 150′ is not only structurally identical to shaft 150, but normally will be an adjacent part of the same shaft (i.e., switches 87 and 97 may be wafer switches mounted on the same shaft). Additionally, the uppermost pair of stationary contacts (164' and 168') of switch 97 are connected to the A.C. source 100 in a directly analogous manner to the corresponding contacts of switch 87, namely, by leads 172' and 176' (and leads 174 and 178), respectively. Similarly the D or right-hand position stationary contacts (183' and 187') of switch 97 are connected by leads 185' and 196', and by leads 189' and 192', respectively, to the D.C. source 102 (by final leads 194 and 198, respectively). Thus when the ganged arms of the switches are in their uppermost (A) position, both motors are supplied the same A.C. current, so as to cause synchronous operation thereof. When the ganged switch arms are in their right-hand (D) position, both motors are stopped by the supply of (the same polarity of) D.C. current to coils 118 and 118' thereof.

The B and C (i.e., left and down) positions of the arm (148') of switch 97 yield the inverse connections of motor 94 to those of motor 84 caused by the previously described corresponding positions of arm 148 of switch 87. Thus, one stationary contact 165' at the left (B) position of switch 97 is connected to one side of the D.C. source 102 through lead 205, and leads 192' and 194, and the other contact 169' thereof is connected by lead 207 and 196' and 198 to the other side of the D.C. source. Therefore when both switch arms are in their left or B position, motor 84 will be running (A.C. operation) but motor 94 will be stopped (because of the D.C. connection). The lower (C) position stationary contacts (182', 186') of switch 97 are connected by leads 202 and 206, respectively, to opposite sides of the A.C. source 100 (through leads 176' and 178 and through leads 172' and 174, respectively). Therefore the C position of the ganged switch arms causes motor 84 to be stopped (D.C.) and motor 94 to run (A.C.).

The overall functioning of the switching arrangement is thus:

A position.—Both motors (and choppers) running synchronously, with phase relationship determined by the physical adjustment of motor 94.

B position.—Motor 84 (and chopper 80) running; motor 94 (and chopper 90) stopped with chopper 90 in a position determined by the physical adjustment of the motor assembly (see arrow 91 in FIG. 1).

C position.—Motor 84 (and its chopper) stopped with an aperture (83) in the beam at 42 (see FIG. 1); motor 94 (and its chopper) rotating.

D position.—Motor 84 still stopped in its open position as in C switch position above; motor 94 also stopped in a position determined in the same manner as in the B position above.

If motor 84 is rotatively adjustable (as well as motor 94), then the stopped position of chopper 80 (in the C and D positions) may also be varied from its open condition.

Although the invention has been described as used in a particular optical instrument for determining the luminescence (i.e., fluorescence and phosphorescence) of a sample, it may obviously be utilized in other types of instruments. Thus the invention may provide any instrument with synchronous operation of a pair of rotating choppers in any desired phase relationship, allow stopping of at least one chopper (or both), and allow resumption of rotation of both choppers in the same original phase relationship. The invention may be utilized to operate various rotating elements other than choppers. For example, the rotating element may comprise a disc having a series of different radiant energy beam-modifying means (for example, alternate red and green filters). In fact, each of the optical elements may affect the beam in ways other than absorbing a part or all of the radiant energy. For example, a pair of synchronously rotating similar optical wedges (with adjustable phase relationship) will yield a circular scan of variable size. Therefore the term "optical element" as used in the following claims is not intended to be limited to a chopper. Similarly the invention is not limited to any of the specific details of the illustrated embodiment, except as explicitly required by the claims.

I claim:

1. An assembly for an optical instrument comprising:
   a pair of rotatably mounted optical elements;
   driving means for synchronously rotating both of said elements, drivingly connected thereto;
   means for causing rotative adjustment of at least one of said optical elements relative to the other, so as to set a desired phase relationship therebetween;
   control means operatively connected to said driving means and having at least two different positions, namely a first position (*a*) causing said driving means to rotate both of said elements synchronously; and a second position (*b*) stopping one of said rotating elements in a known desired position, while rotating the other element;
   said driving means and said control means each being of such construction and being so interconnected that moving of said control means from said second position (*b*) in which one of said optical elements is stopped to said first position (*a*) in which both elements are rotating will automatically cause synchronous rotation of said elements in the same original, desired phase relationship set by said means for causing rotative adjustment.

2. An optical assembly according to claim 1, in which:
   said driving means comprises a pair of synchronous A.C. electric motors, each of which is drivingly connected to a different one of said pair of optical elements.

3. An optical assembly according to claim 2, in which:
   said rotative adjustment means comprises means for physically rotating at least one of said synchronous motors about its own rotor axis,
   whereby a phase difference is introduced between the rotative positions of said motors corresponding to the same part of a common A.C. electrical current supplied thereto.

4. An optical assembly according to claim 1, in which:
   said driving means comprises a pair of synchronous A.C. electric motors each of which is independently drivingly connected to a different one of said pair of optical elements;
   at least a first of said motors comprising a polarized element of such construction that a D.C. current will cause said first motor to stop in a particular angular location so that its associated optical element will stop in said known desired position;
   and said control means comprises a switch means having at least said two positions (*a*) and (*b*) respectively for (*a*) supplying A.C. current to both said motors, and (*b*) supplying a D.C. current to said first motor and an A.C. current to the other second motor.

5. An optical assembly according to claim 4, in which:
   the second of said motors also comprises a polarized element of such construction that a D.C. current supplied thereto will cause stopping thereof in a second particular angular location and therefore of its associated optical element in a second known desired position.

6. An optical assembly according to claim 5, in which:
   said control switch means comprises at least a third operative position (*c*) for concurrently supplying A.C. current to said first motor and D.C. current to said other second motor,
   thereby rotating the first of said optical elements and stopping the second in said known desired position.

7. An optical assembly according to claim 5, in which:
   said control switch means comprises an additional position (d) for supplying D.C. current to both said motors, thereby stopping both said motors and therefore both said optical elements in said known desired positions.

8. An optical assembly according to claim 4, in which: at least said first motor is a polarized hysteresis synchronous A.C. motor.

9. An optical assembly according to claim 8, in which: said polarized element of said first motor comprises a permanent magnet as part of its rotor structure, whereby said first motor has permanently polarized characteristics, regardless of whether A.C. or D.C. current is being supplied thereto by said control means.

10. An optical assembly according to claim 1, in which: said rotatably mounted optical elements comprise optical choppers having alternate relatively opaque and relatively transparent portions; whereby a radiant energy beam intersected by both said optical choppers will be chopped in any desired phase relationship when both said choppers are rotated synchronously, and will be chopped by the other rotating chopper when one of said choppers is stopped with a relatively transparent portion in said radiant energy beam.

References Cited

UNITED STATES PATENTS

| | | | |
|---|---|---|---|
| 2,422,626 | 6/1948 | Tolson et al. | 318—166 |
| 3,178,992 | 4/1965 | Murphy et al. | 250—233 |
| 3,217,588 | 11/1965 | Chitayat | 350—96 |
| 3,217,589 | 11/1965 | Chitayat | 350—96 |
| 3,435,213 | 3/1969 | Colbow et al. | 350—273 |

OTHER REFERENCES

"The Standard Handbook for Electrical Engineers," 17–582, McGraw-Hill, 1949, Archer E. Knowlton.

RONALD L. WIBERT, Primary Examiner

C. CLARK, Assistant Examiner

U.S. Cl. X.R.

250—233